(No Model.)

P. CUNNINGHAM.
STEAM DAMPER REGULATOR.

No. 303,920. Patented Aug. 19, 1884.

Witnesses
Wm A Lowe
Edw'd Wall

Inventor
P. Cunningham
By A. M. Pierce,
Atty.

UNITED STATES PATENT OFFICE.

PATRICK CUNNINGHAM, OF NEW BEDFORD, MASSACHUSETTS, ASSIGNOR TO BOWKER & TRIPP, OF SAME PLACE.

STEAM DAMPER-REGULATOR.

SPECIFICATION forming part of Letters Patent No. 303,920, dated August 19, 1884.

Application filed April 7, 1884. (No model.)

*To all whom it may concern:*

Be it known that I, PATRICK CUNNINGHAM, a citizen of the United States, and a resident of New Bedford, in the county of Bristol and State of Massachusetts, have invented certain new and useful Improvements in Steam Damper-Regulators, of which the following is a specification.

My invention relates especially to that class of self-acting arrangements in which pressure of steam acts upon a damper or register to regulate the sectional area of a flue or draft-hole, and has for its object the production of a device wherein means are provided for keeping the steam from the moving parts of the regulator, preventing the rust, insuring great delicacy and consequent accuracy of action.

To attain this end my invention consists, especially, in a hemispherical rubber lining or diaphragm located within the chamber of the regulator, below the actuating-piston, said rubber lining being formed of a single piece, and so connected with the steam-inlet pipe as to prevent the contact of the steam and the piston, and dispensing with any packing therearound, all of which will be hereinafter first fully described, and then pointed out in the claims.

Figure 1:
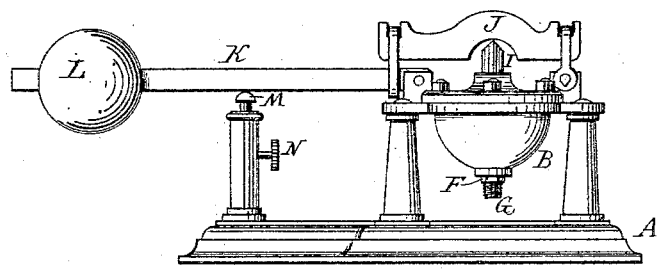
Figure 2:
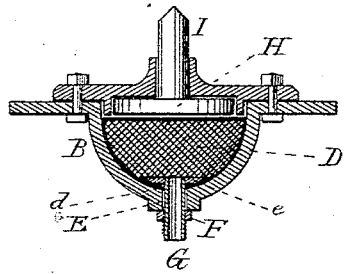

In the drawings, Figure 1 is a side elevation of a regulator wherein my improvement is employed, and Fig. 2 is a sectional view of the device, showing the location and arrangement of my improvement.

Like letters of reference, wherever they occur, indicate corresponding parts in both figures.

A is the main frame of the device, upon which a hemispherical metal casing, B, is secured.

D is a hemispherical rubber lining or diaphragm, fitting into said casing. In molding said lining a hole is left at *d*, through which a section of tubing, E, provided with an enlargement or head, *e*, upon its inner extremity, is passed. A nut, F, engages with a screw-thread upon tube E, and when rubber lining D is placed in position and said nut tightened, the parts of the rubber beneath the head *e* form a perfect joint, preventing any escape of steam from the rubber lining or diaphragm.

G is the steam-pipe leading to the boiler.

H is a piston resting upon the flat surface of lining or diaphragm D, and provided with a projection, I, engaging with a lever, J, which actuates the lever K for moving the damper.

L is the weight for regulating the pressure required to operate the said damper.

M is a rest, which may be graduated in height by a set-screw, N.

When constructed and arranged in accordance with the foregoing description, my improved regulator will be found admirably adapted to the uses and purposes for which it is intended. The steam can only act within the rubber lining or diaphragm, and never comes in contact with the piston. No packing is required, and the device is extremely sensitive to every change in the steam-pressure within the boiler.

Having now fully described my invention, what I claim as new therein, and desire to secure by Letters Patent, is—

1. In a steam damper-regulator of the character herein specified, the hollow hemispherical rubber lining or diaphragm adapted to receive a steam-pipe, substantially as shown and described.

2. In a damper-regulator of the character herein specified, a hollow hemispherical rubber lining or diaphragm, perforated at the bottom, as set forth, in combination with a tube passing through the perforation, said tube being provided with an enlargement upon its inner extremity, substantially as shown and described.

3. In a steam damper-regulator, base A, shell B, rubber lining or diaphragm D, tube E, having an enlargement, *e*, and the piston H, the whole combined and arranged to operate substantially as and for the uses and purposes shown and described.

Signed at New Bedford, in the county of Bristol and State of Massachusetts, this 28th day of March, A. D. 1884.

PATRICK CUNNINGHAM.

Witnesses:
CHAS. F. DAVIS,
J. L. GILLINGHAM.